United States Patent
Monaghan et al.

[15] 3,680,194
[45] Aug. 1, 1972

[54] METHOD AND APPARATUS FOR ASSEMBLING FASTENER COMPONENTS IN STRIP-LIKE MATERIAL

[72] Inventors: Frank Monaghan, Glendale; Walter W. Mosher, Jr.; Donald A. Long, both of Burbank, all of Calif.

[73] Assignee: Precision Dynamics Corporation, Burbank, Calif.

[22] Filed: Sept. 21, 1970

[21] Appl. No.: 73,733

[52] U.S. Cl.................29/430, 29/208 D, 29/211 D
[51] Int. Cl.......B23p 19/00, B23p 19/04, B23q 7/10
[58] Field of Search..29/429, 200, 211 R, 430, 208 D, 29/211 D

[56] References Cited

UNITED STATES PATENTS 3,556,743  1/1971  Yeager..........................29/429
3,583,451  6/1971  Dixon...........................29/211 R

*Primary Examiner*—Thomas H. Eager
*Attorney*—Mahoney, Hornbaker & Schick

[57] ABSTRACT

Fastener components having transversely enlarged heads and longitudinally extending shanks are fed one at a time to a pick-up station, engaged by a reciprocal slide and carried to an assembly positioner and retained at the assembly positioner with the component head received in a socket and the component shank projecting properly oriented for a final assembly projecting through strip-like material. The retention at the assembly positioner may be by vacuum against the fastener component head within the socket or by grippers forming the socket and engaging the head. In one form of the apparatus, the fastener component is carried to the sheet-like material positioned over a pilot pin at an assembly station by the assembly positioner with the component shank projecting through the sheet-like material during withdrawal movement of the pilot pin, the assembly being automatically disengaged from the assembly positioner during the assembly operation for removal upon withdrawal of the assembly positioner. In another form of the apparatus, the assembly positioner is at the assembly station and the strip-like material is telescoped over the component shank, the component shank or strip-like material engaged by a reciprocal plunger to complete the assembly and the entire assembly moved away from the assembly station for disengagement from the assembly positioner while a next to be assembled fastener component is simultaneously fed to the assembly positioner.

48 Claims, 26 Drawing Figures

INVENTORS.
FRANK MONAGHAN,
WALTER W. MOSHER, JR.,
DONALD A. LONG
BY MAHONEY, HORNBAKER
AND SCHICK
ATTORNEYS

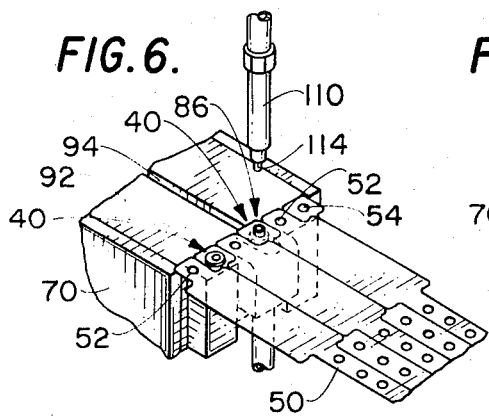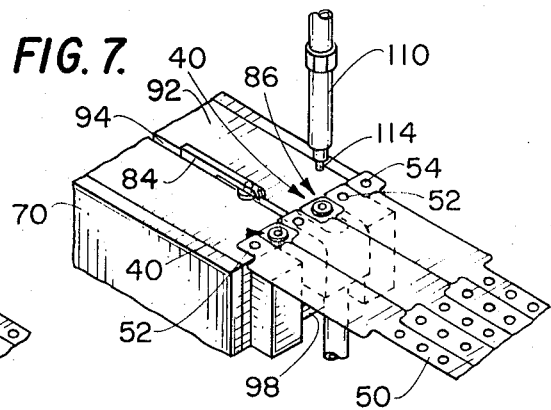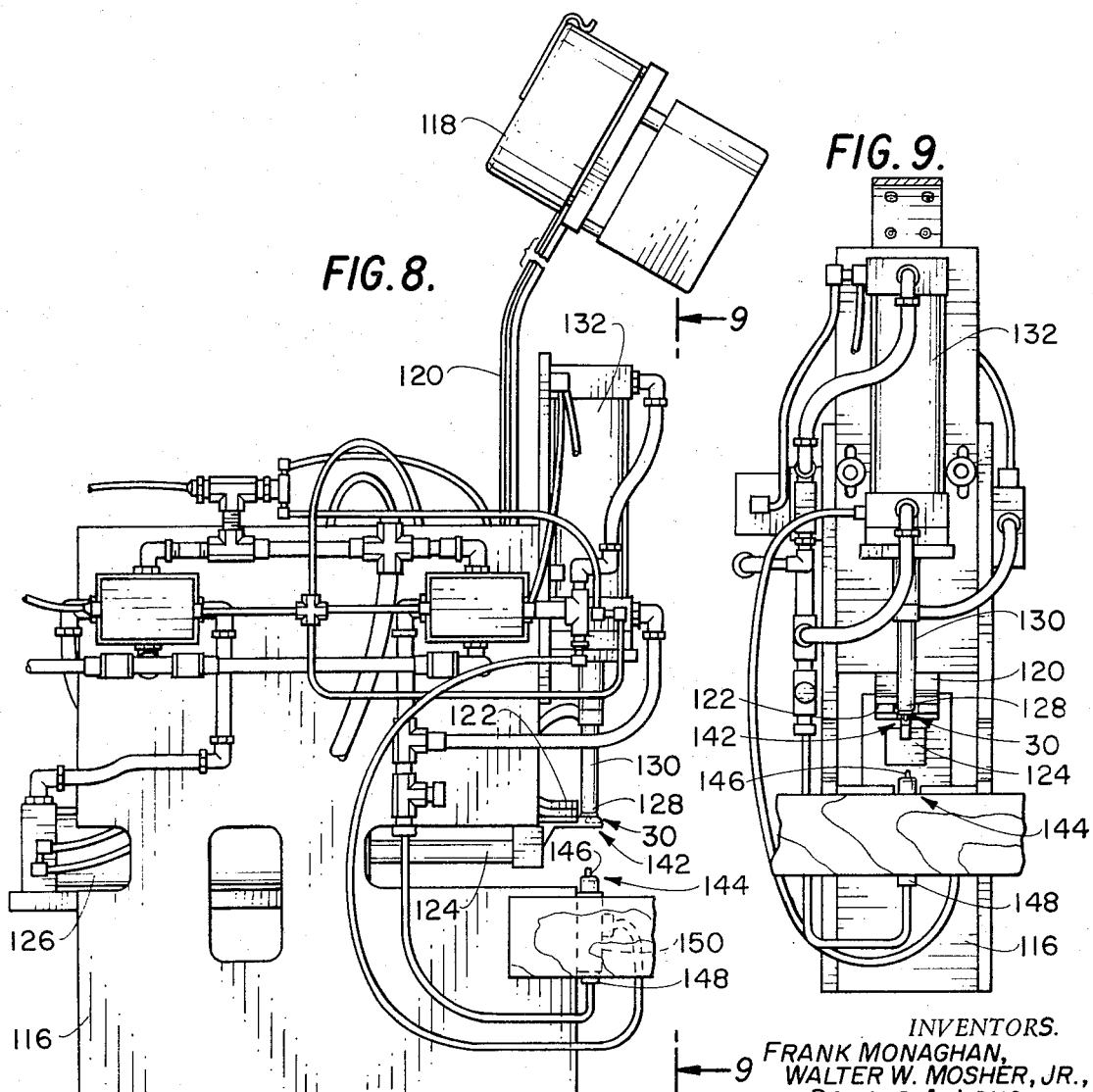

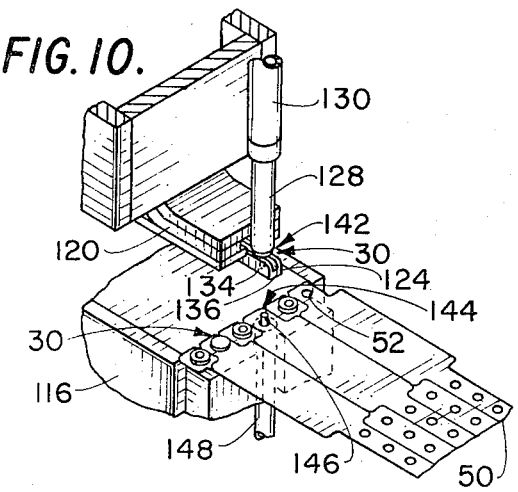

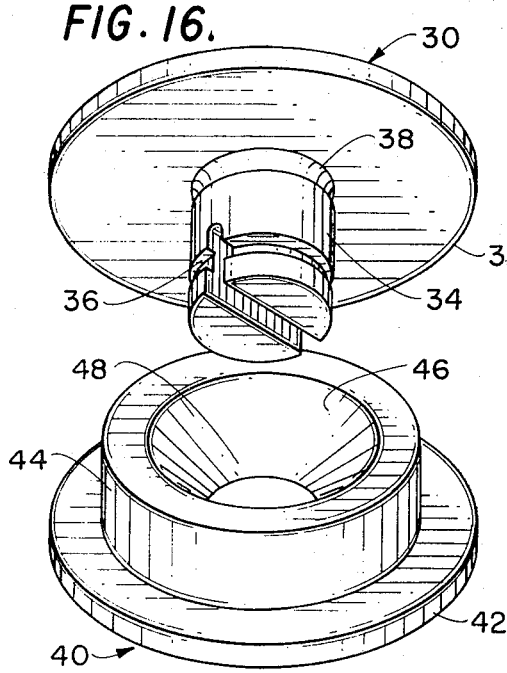
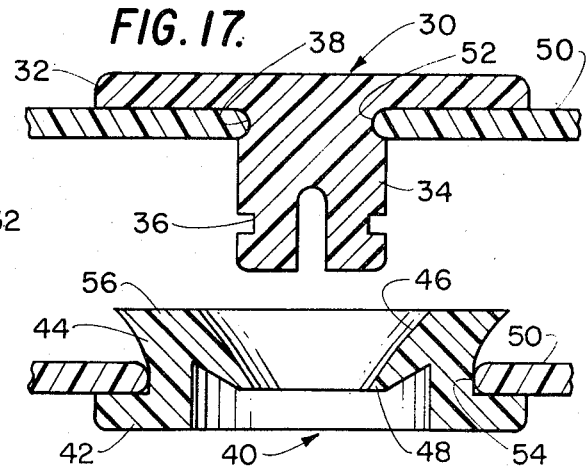
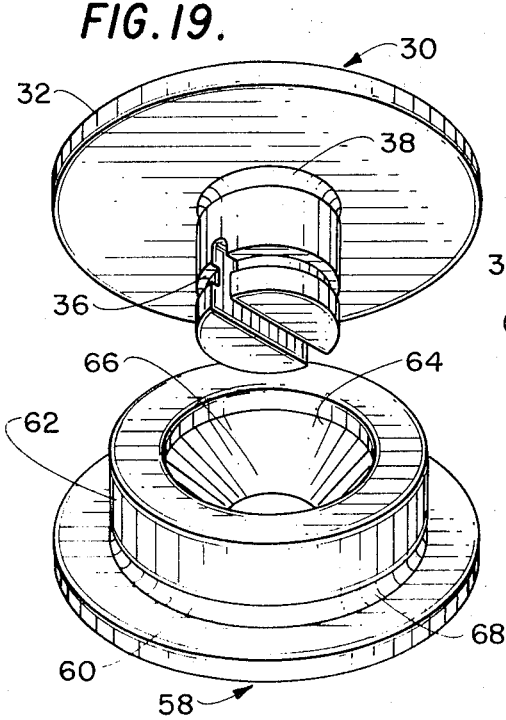
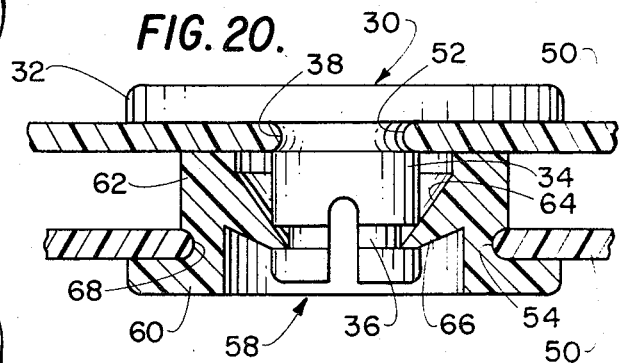

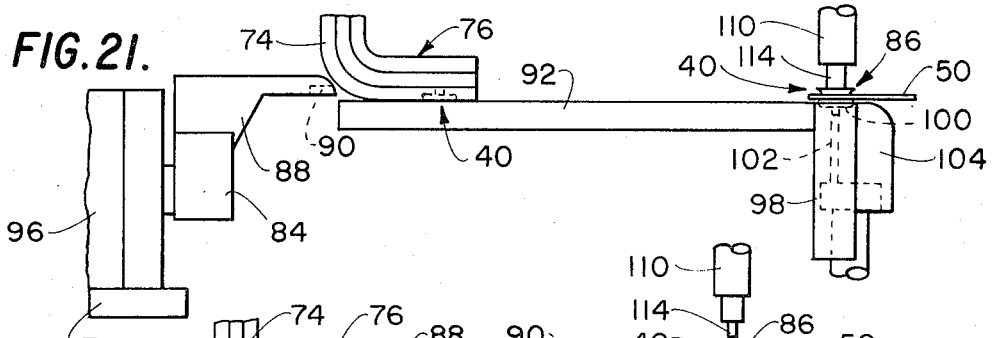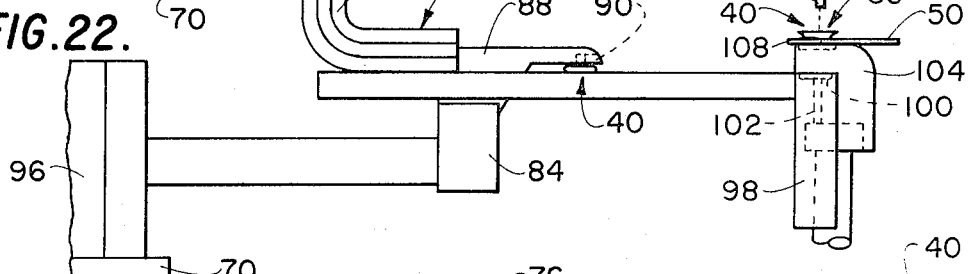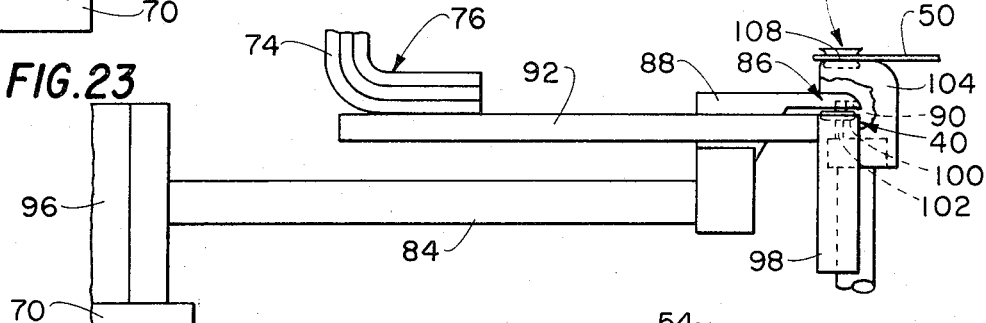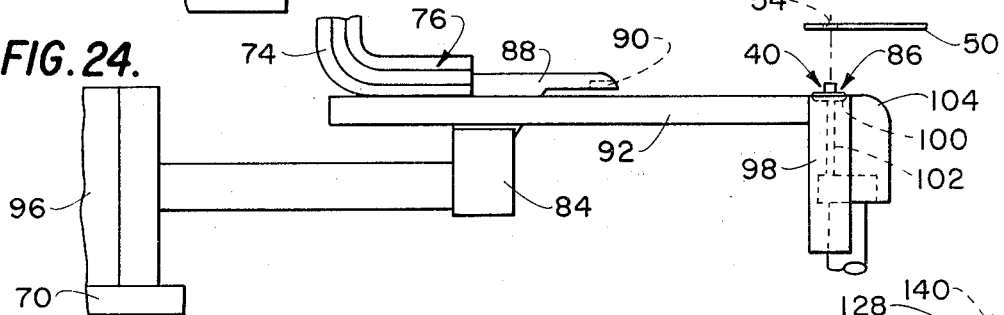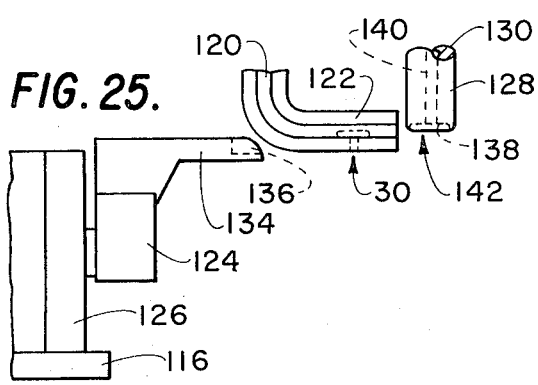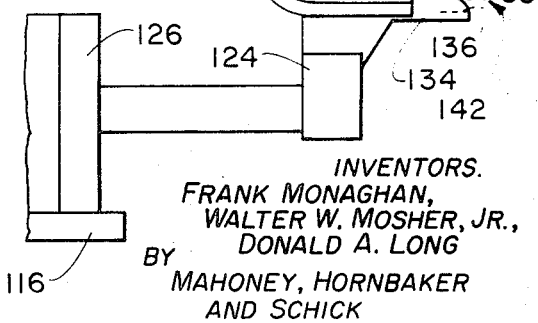

METHOD AND APPARATUS FOR ASSEMBLING FASTENER COMPONENTS IN STRIP-LIKE MATERIAL

BACKGROUND OF THE INVENTION:

This invention relates to a method and apparatus for assembling fastener components in strip-like material incorporating unique method and apparatus concepts which make possible the effective and very efficient assembly of extremely small, preferably plastic, fastener components with strip-like or sheet-like material, preferably somewhat stretchable plastic strips or sheets, at exact predetermined locations on a rapid, mass-production basis. Furthermore, the unique methods and apparatus of the present invention accomplishes the fastener component and strip-like or sheet-like material assembly with minimum possible production errors and with a minimum of human handling, thereby virtually eliminating basic and time-consuming problems prevalent with prior methods and apparatus. Also, the unique methods and apparatus of the present invention are extremely versatile so as to be adaptable to various types of fastener components, for instance, both male and female fastener components, and using various forms of assembly securement between the fastener components and the strip-like or sheet-like material in the final assembly thereof.

Various forms of fastener components have heretofore been installed in and used for fastening strip-like or sheet-like materials, the fastener components usually consisting of a male component received in a female component for fastening various parts of the strip-like or sheet-like material together, and the fastener components in some cases being formed of metal, in some cases of plastic and in still other cases of combinations of the two materials. The strip-like or sheet-like material may be of virtually any form, examples being various cloths and the more modern stretchable plastics, and may have various thicknesses from relatively thick to relatively thin, one of the more common modern examples of fastener component and strip-like or sheet-like material combinations being plastic fastener components used installed in and for fastening relatively thin stretchable plastic materials, such as is found in luggage tags, hospital patient identification bracelets and various article encasements and coverings. In view of the fact that the forms of strip-like or sheet-like material involved and which which the fastener components must be assembled varies over a considerable range, and such material in a given case may be relatively narrow or relatively wide with single or a multiplicity of sets of fastener components, and, as hereinbefore stated, of various thicknesses, the terms "strip-like" and "sheet-like" are used herein synonymously and are not intended to limit the size or shape of the particular material within which the fastener components are assembled, such terms being intended to be virtually all-inclusive of the materials with which fastener components are used and the hereinafter arbitrary choice of the term "strip-like" material not intended to be limiting to the principles of the present invention.

One of the major problems encountered in the assembly of virtually all fastener components of the type herein involved is occasioned by the fact that the fastener components are relatively small, in some cases extremely small, and therefore difficult to handle prior to and during assembly with the strip-like material, whether such handling is merely by human hands or more preferably by mechanical apparatus. Obviously, these small fastener components in order to provide proper assembly must be specifically oriented relative to the sheet-like material within which they are assembled, for instance, the fasteners are many times aligned with preformed holes previously formed in the sheet-like material at predetermined locations. After such specific orientation and proper alignment with the sheet-like material, the fastener components then must be inserted into their final assembled positions, sometimes even including a final fastener component forming step to complete the final securement with the strip-like material, all of this precise orientation, alignment and insertion being carried out while attempting to maintain maximum speed of assembly in order to reduce the time and labor costs of the final product to a minimum, and to provide a low cost, marketable product.

Many prior attempts have been made to satisfy the foregoing requirements but none have been totally satisfactory in being able to unite the desired production speed with product quality necessary to satisfy the marketing needs of satisfactory quality at low market cost. In order to fully appreciate the stringent production quality demands to be met in these assembly operations, it must be kept in mind that many male and female fastener component sets are of the self-locking type, that is, when once joined or fastened, it is impossible to separate the same without destruction of one or the other of such components so that it is impossible to provide any great degree of testing of the final component and material assemblies and it is only possible to visually inspect the same. Even when the fastener component sets are not self-locking, the time required for any appreciable frequency of testing of the final assemblies is still prohibitive from the cost of time and labor involved if a competitive product is to be marketed.

Although the foregoing must be considered, still an additional major factor must also be taken into account, and that is that it is extremely easy to damage and deform the small fastener components in handling prior to and during assembly thereof with the sheet-like materials, and this is particularly true of fastener components formed of plastic, the more competitive material on the modern market. Obviously, if either one of the fastener components in a given set or in any set of a given product in assembly with the sheet-like material is damaged and will not operate satisfactorily, the entire final product is unsatisfactory so that a single damaged fastener component may cause the requirement of scrapping the entire product. Thus, it is clearly evident that there is a longfelt want and need for methods and apparatus to satisfy the foregoing requirements in an efficient and positive manner appropriate for modern, mass-production manufacture.

OBJECTS AND SUMMARY OF THE INVENTION

It is, therefore, an object of this invention to provide methods and apparatus for assembling fastener components in strip-like material whereby extremely small fastener components are efficiently handled on a mass-production basis and presented for assembly properly oriented for fast and convenient assembly with sheet-like materials. In one form of the present invention, the fastener components are aligned for feeding to a pick-up station, moved to a transfer station, then moved one at a time to an assembly station and assembled by movement of the fastener components while the sheet-like material is retained stationary at an assembly station, all in proper timing and properly positioned for such assembly. In another form of the present invention, the fastener components are aligned for feeding to the pick-up station, moved from the pick-up station one at a time directly to the assembly station and retained stationary at the assembly station during assembly by the movably telescoping of the sheet-like materials thereover, again, all in proper timing and proper positioning for such assembly.

It is a further object of this invention to provide methods and apparatus for assembling fastener components in strip-like material wherein the fastener components, despite the small size thereof and despite the requirement of being positioned in single, exact assembly positions, are presented at the assembly station properly oriented and securely retained in said proper orientation ready for such assembly during every assembly operation, whether the fastener components are moved to the assembly station during the actual assembly operation or are retained at said assembly station during the actual assembly operation. Again in one form of the present invention, proper orientation of the fastener components for exact assembly positioning is initially accomplished and securely maintained by vacuum or suction forces, preferably actionable within a positioning socket exactly conforming to certain portions of the small fastener components. In another form of the methods and apparatus of the present invention, the same initial establishment and secure continued maintenance of such exact assembly positioning is accomplished through mechanical grippers, such grippers preferably also having portions exactly conforming to certain portions of the small fastener components and inherently requiring proper orientation of such components while retained by such grippers and during the assembly operations.

It is still a further object of this invention to provide methods and apparatus for assembling fastener components in strip-like material whereby, despite the secure retainment of the fastener components during the assembly operation, the final assembly of the fastener components with the various sheet-like materials is quickly accomplished while simultaneously releasing the retainment of the fastener components after the assembly operation has been accomplished so as not to require increased production time. According to certain of the principles of the present invention and where the fastener components are retained prior to and during the assembly with the sheet-like materials by the vacuum forces, the final assembly is either retained while the mechanism applying the vacuum gripping or retaining is moved therefrom or the final assembly is physically moved away from the vacuum force application and retainment, in either case thereby reducing the effect of such vacuum force and accomplishing release of the final assembly. Also where vacuum retained, the application of vacuum force may be interrupted or reduced immediately following or at the latter stages of the assembly operation so that upon completion of the assembly operation, the component and material assembly is automatically released. Still further according to certain of the principles of the present invention, where the fastener component is retained prior to and during the assembly operation by mechanical grippers, mechanism may be provided for automatically opening the mechanical grippers directly during the assembly operation for effecting disengagement of such grippers with the fastener component as an inherent part of the assembly operation, thereby again accomplishing quick release of the component and material assembly at completion of the assembly operation.

It is still an additional object of this invention to provide methods and apparatus for assembling fastener components in strip-like material which satisfy all of the foregoing objects in a relatively simple and efficient manner at high production speeds so as to produce final products of component and material assemblies at prices sufficiently low to meet the modern competitive market. As is evident from the foregoing, all of the assembly operations are carried out in an exact and precise manner, yet such assembly operations may be performed with equipment of maximum simplicity so as to reduce equipment maintenance and down time costs to a minimum, and further minimize labor and equipments costs. Still at the same time, despite the minuteness and fragility of the fastener components involved, particularly where formed out of plastics, and the difficult handling and positioning problems with both the extremely small fastener components and the sheet-like materials required for completing the assembly, such assembly is carried out with a minimum of product damage losses, one of the major factors with the prior methods and apparatus.

BRIEF DESCRIPTION OF THE DRAWINGS

FIG. 6 is a fragmentary, perspective view looking at the assembly station of the apparatus of FIGS. 1 through 5 and illustrating a fastener component in final assembly positioning thereat, strip-like material telescoped thereover ready for the final assembly operation and a reciprocal plunger ready for downward movement to complete the final assembly operation;

FIG. 7 is a view similar to FIG. 6, but after the final assembly operation has been completed and the finally assembled component and material are being released from the final assembly station while a next fastener component is being fed to said final assembly station;

FIG. 8 is a fragmentary, side-elevational view of another embodiment of apparatus for assembling fastener components in strip-like material. According to certain of the principles of the present invention wherein the fastener components are moved one at a time to the assembly station and to the strip-like material positioned at said assembly station in carrying out the final assembly operation;

FIG. 9 is a fragmentary, front-elevational view of the apparatus of FIG. 8 looking in the direction of the arrows 9—9 in FIG. 8;

FIG. 10 is an enlarged, fragmentary perspective view showing the assembly station area of the apparatus of FIGS. 8 and 9 with a fastener component being fed to a reciprocal assembly positioner by a transfer slide, and the strip-like material being positioned at the assembly station ready for receiving the fastener component during the final assembly operation;

FIG. 11 is a view similar to FIG. 10, but with the assembly positioner having carried the fastener component to the assembly station and into finally assembled position with the strip-like material;

FIG. 12 is a fragmentary, front-elevational view of apparatus similar to the first embodiment apparatus of FIG. 1, but using mechanical grippers for positioning the fastener component at the final assembly station, rather than vacuum forces as used in the apparatus of FIG. 1, the mechanical grippers in FIG. 12 retaining a fastener component at the assembly station ready for the final assembly operation but without the strip-like material assembled therewith;

FIG. 13 is a view similar to FIG. 12 and of the apparatus of FIG. 12 showing the final component and material assembly operation completed;

FIG. 14 is a fragmentary, front-elevational view of apparatus similar to the second embodiment apparatus of FIGS. 8 and 9, but showing mechanical gripper retainment of the fastener component on the raised assembly positioner ready for downward reciprocation to the assembly station during the final assembly operation;

FIG. 15 is a view similar to FIG. 14 after completion of the component and material final assembly operation;

FIG. 16 is a perspective view of one embodiment of typical male and female fastener components of the type assembled with strip-like material in use of the various forms of apparatus of the present invention;

FIG. 17 is a vertical sectional view of the fastener components of FIG. 16 after assembly of said components with strip-like material;

FIG. 18 is a view similar to FIG. 17, but with the fastener components in typical fastened position, one with the other and retaining the strip-like material in such fastened condition;

FIG. 19 is a perspective view similar to FIG. 16, but showing another embodiment of male and female fastener components for assembly with strip-like material using various of the apparatus of the present invention;

FIG. 20 is a vertical sectional view of the fastener components of FIG. 19 assembled with strip-like material and in component fastened condition;

FIGS. 21 through 24 are enlarged, fragmentary, progressive views of the pick-up and final assembly stations of the apparatus of FIGS. 1 through 7 showing various stages of fastener component feeding and final assembly with strip-like material; and FIGS. 25 and 26 are progressive views similar to FIGS. 21 through 23, but of the pick-up and a transfer station at the assembly positioner showing a fastener component first ready for pick-up and movement to the transfer station and then moved to the transfer station retained by the assembly positioner properly oriented ready for movement to the assembly station for the final assembly operation.

Figure 1:
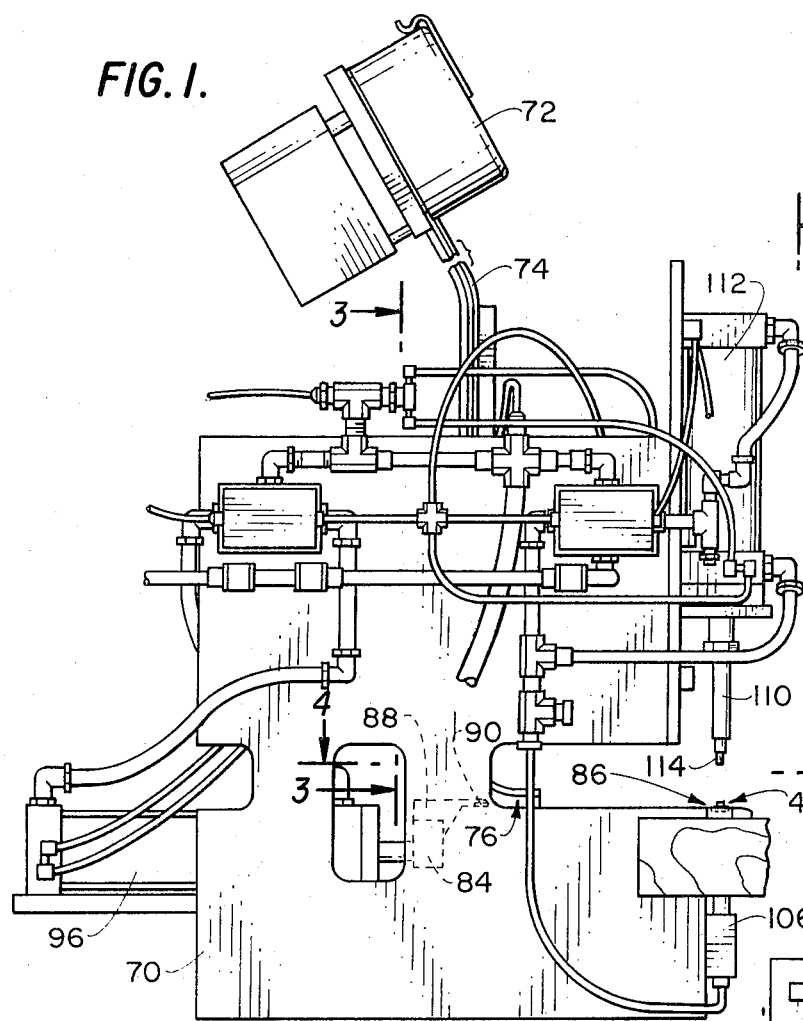
FIG. 1 is a fragmentary, side elevational view of one embodiment of apparatus according to the principles of the present invention for assembling fastener components in strip-like material wherein the fastener component is retained at an assembly station, the strip-like material is partially telescoped thereover in general final assembly alignment and a final assembly operation is carried out to complete the component and material assembly.

DESCRIPTION OF THE BEST EMBODIMENTS CONTEMPLATED:

The various embodiments of apparatus of the present invention for carrying out certain of the methods for assembling fastener components in strip-like material of the present invention are illustrated and described herein specifically usable for assembling, preferably plastic, male and female fastener components in stretchable, preferably plastic, strip-like material forming hospital human identification bracelets as shown, for instance, separate from the assembly apparatus in FIGS. 16 through 20, and as positioned on various of the apparatus in FIGS. 6, 7, 10 and 11, as well as in other figures as will be hereinafter pointed out. In order to more clearly understand certain functioning of the various embodiments of assembly apparatus to be hereinafter described, it is helpful to first understand the elements of the various forms of male and female fastener components and their relationship with the hospital identification bands or the strip-like material before, during and after the assembly operations. It should be understood, however, that the methods and apparatus of the present invention are readily adaptable to many types and forms of fastener components as installed with various types of strip-like material used for various purposes and the specific illustrations and descriptions herein are intended to be broadly applied, the particular illustrations only being intended as typical illustrations of the principles of the present invention.

Referring to FIG. 16, a male fastener component is generally indicated at 30 and includes a generally transversely extending, enlarged, generally cylindrical or wafer-like head 32 and a centrally longitudinally extending, preferably cylindrical shank 34, the shank being formed with a fastening portion 36 spaced longitudinally outwardly from the head and an annular groove 38 adjacent the head. A female fastener component is generally indicated at 40 and includes a same transversely extending, generally cylindrical or wafer-like head 42 and centrally longitudinally extending, cylindrical shank 44, the shank in this case being larger and having a central longitudinally extending opening 46 also preferably through the head and forming a transversely inwardly extending fastening portion 48. As shown in FIG. 17, the male fastener component 30 is assembled with strip-like material 50 by inserting the shank 34 longitudinally or axially through a preferably preformed material opening 52 with the material stretching over the shank and ultimately returning to shape engaged in the shank groove 38 abutting the male fastener component head 32, the female fastener component 40 being similarly assembled with the same strip-like material 50 or a different piece of said strip-like material with the shank 44 received through a larger opening 54 and the strip-like material not being required to stretch but rather the female fastener component shank being then deformed with a flared portion 56 to retain the assembly. As shown in FIG. 18, the various layers of the strip-like material 50 are then fastened together by telescoping the shank 44 of the female fastener component 40 longitudinally or axially over the shank 34 of the male fastener component 30 and engaging the fastening portion 48 of the female fastener component with the fastening portion 36 of the male fastener component.

In the form of male and female fastener components shown in FIG. 19, the same male fastener component 30 is used, but a slightly different female fastener component generally indicated at 58 having a same head 60, a similar shank 62 and the shank having a same central opening 64 and same fastening portion 66, is used. The female fastener component shank 62, rather than being flared after assembly with the strip-like material 50, is formed with an annular groove 68 about the shank 62 adjacent the head 60 and, as in the case of the male fastener component 30, the strip-like material 50 is stretched over the shank 62 of this female fastener component 58 and engaged in the groove 68 therein returning to shape and retaining the assembly. The two layers of strip-like material 50 are secured together by the male and female fastener components 30 and 58 in the same manner as before by telescoping the female fastener component over the male fastener component and engaging the respective fastening portions 66 and 36.

More particularly to the apparatus of the present invention, an embodiment of such apparatus specifically formed for assembling the female fastener components 40 just described and shown in FIGS. 16 through 18 is illustrated in FIGS. 1 through 7 and FIGS. 21 through 24, such apparatus being formed of usual materials in large part with somewhat standard components except as hereinafter specifically pointed out but arranged in a unique manner for performing the unique assembly methods of the present invention. As shown, the apparatus includes a main frame 70 mounting a fastener component hopper 72, the outlet of which communicates with a fastener component supply track 74 extending generally vertically downwardly and then horizontally to a fastener component pick-up station 76. The supply track 74 is lengthwise channel-shaped specifically formed for retaining the heads 42 of the female fastener components 40 with the shanks 44 extending forwardly in track vertical portion, or to the right as shown in FIG. 1, and upwardly in the track horizontal portion as can be clearly seen in FIGS. 21 through 24.

Figure 3:
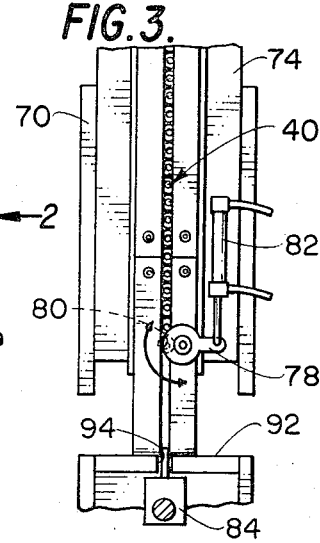
FIG. 3 is a fragmentary, partial elevational and partial sectional view looking in the direction of the arrows 3—3 in FIG. 1.

The hopper 72 is of a usual rotating impeller type feeding the female fastener components 40 only in the correct positioning into the upper end of the supply track 74 resulting in a plurality of said female fastener components being lengthwise consecutively aligned downwardly in the supply track. As shown in FIG. 3, a pivotal feed gate 78 is mounted on the supply track 74 intermediate the vertical portion thereof and includes a fastener component pocket 80 normally aligned receiving the leading of the female fastener components 40 in the supply track, but pivotal counterclockwise, as shown in FIG. 3, by an air cylinder 82 to release the female fastener components 40 one at a time for slidable movement downwardly through the supply track 74 by gravity from the vertical supply track portion into and through the horizontal supply track portion to the pick-up station 76. Thus, at the appropriate moment, the feed gate 78 is pivoted by the air cylinder 82 causing the fastener component pocket 80 of said feed gate to release a single of the female fastener components 40 for movement downwardly to and positioning at the pick-up station 76.

A fastener component transfer slide 84 is mounted on the main frame 70 horizontally slidable through the pick-up station 76 reciprocally to and from an assembly station 86, the transfer slide having a fastener component engagement portion 88 forming a forwardly and downwardly opening fastener component pocket 90 as best seen in FIGS. 1 and 21 through 24. Also, the fastener component engagement portion 88 of the transfer slide 84 projects upwardly through a slotted slide plate 92 and through a lengthwise slot 94 of the supply track 74 so as to exactly properly captivate a single of the female fastener components 40 positioned at the pick-up station 76 as the transfer slide 84 passes thereby in the forward direction toward the assembly station 86 and move said fastener component along the slide plate within the fastener component pocket 90 to and depositing the same at the assembly station with the transfer slide then returning rearwardly to rearwardly of the pick-up station. The transfer slide 84 is reciprocally movable in its path of forward feed and rearward return to and from the assembly station 86 by a double acting air cylinder 96 and the sequence of operation thereof will be hereinafter explained in order in a more complete operational description of the apparatus.

The assembly station 86 includes a stationary component assembly positioner 98 upwardly horizontally aligned with the slide plate 92, that is, having the respective upper surfaces thereof horizontally aligned for smooth slidable movement of the female fastener component 40 therebetween during movement thereof by the transfer slide 84. Furthermore, the assembly positioner 98 has an upwardly opening and downwardly recessed component positioning socket 100 formed therein precisely aligned with the path of movement of the transfer slide 84 and preferably precisely formed for receiving downwardly therein an appreciable portion, preferably the major portion, of the female fastener component head 42 when the shank 44 of that female fastener component 40 is projecting upwardly. As best seen in FIGS. 4 and 21 through 24, a vacuum supply line 102 opens internally upwardly through the component positioning socket 100 and is downwardly connected to a usual vacuum supply (not shown) so that immediately upon one of the female fastener components 40 being positioned in the component positioning socket 100 by the transfer slide 84, the vacuum or suction forces created by the vacuum supply line 102 will draw the female fastener component head 42 downwardly into said socket with the surrounding portions of the assembly positioner 98 peripherally surrounding said head transversely thereof and securely retaining the entire female fastener component 40 positioned ready for following assembly operations.

An assembly release mechanism 104 is mounted on the main frame 70 horizontally adjacent and straddling the assembly positioner 98 and particularly the component positioning socket 100 thereof, the assembly release mechanism being vertically reciprocal by an air cylinder 106 relative to the assembly positioner. In normal positions, upper horizontal surfaces 108 of the assembly release mechanism 104 are horizontally aligned with the upper surfaces of the slide plate 92 and the assembly positioner 98, but in an upper release position, these upper horizontal surfaces straddling the assembly positioner 98 and the component positioning socket 100 thereof are spaced above the assembly positioner. Since the upper horizontal surfaces 108 of the assembly release mechanism 104 straddle the component positioning socket 100 of the assembly positioner 98, one of the female fastener components 40 may be positioned in the component positioning socket of the assembly positioner in either the normal or upper release positions of the assembly release mechanism permitting the feed of one of the female fastener components to the component positioning socket even though the assembly release mechanism is in its upper release position for a purpose to be hereinafter described.

Figure 2:
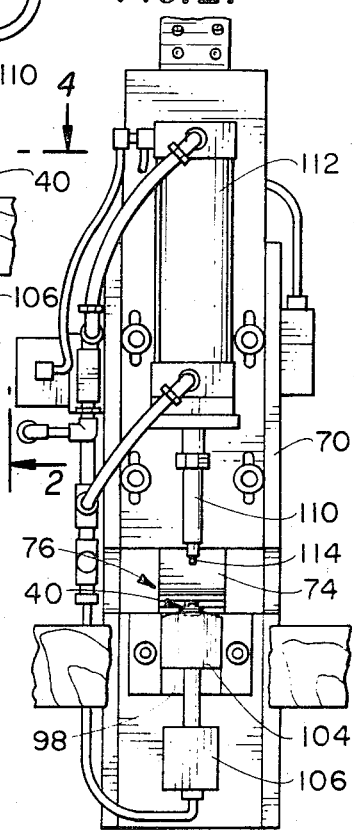
FIG. 2 is a fragmentary, front elevational view looking in the direction of the arrows 2—2 in FIG. 1.
Figure 4:
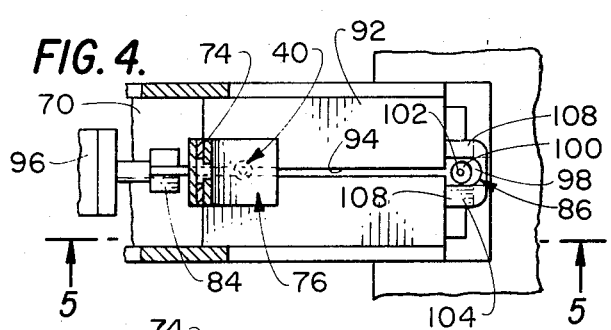
FIG. 4 is a horizontal sectional view, part in top plan, looking in the direction of the arrows 4—4 in FIG. 1 and showing the apparatus component transfer slide ready for operation to feed a component from a component pick-up station to the component and material assembly station.
Figure 5:
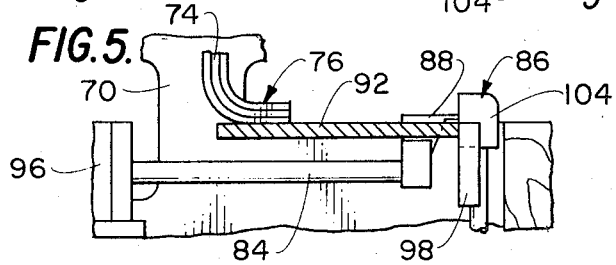
FIG. 5 is a fragmentary, vertical sectional view, part in elevation, looking in the direction of the arrows 5—5 in FIG. 4, but with the component transfer slide at the component and material assembly station depositing a fastener component thereat ready for the assembly operation.

The essentials of the apparatus, except for usual air supplies and air supply controls, the timed operation of which will be evident from a later description of the operation of the apparatus, are completed by a vertically reciprocal assembly plunger 110 reciprocally movable upwardly and downwardly by a double acting air cylinder 112, the upper withdrawn position being shown in FIGS. 1 and 2 and the lower assembly position in FIG. 21. Furthermore, the assembly plunger 110 is exactly aligned for movement downwardly to its lower assembly position overlying the component positioning socket 100 of the component assembly positioner 98 with the lower end of said plunger having an assembly tool 114 engagable, where the female fastener component 40 is involved, with the shank 44 of said female fastener component 40. As will be hereinafter discussed more in detail, where the female fastener component 58 is involved, said assembly tool 114 of the plunger 110 will be formed for telescoping the shank 62 of the female fastener component in use of the particular assembly apparatus presently being described for assembling the female fastener component 58 with the strip-like material 50.

In operation of the apparatus of FIGS. 1 through 7 and FIGS. 21 through 24 for assembling the female fastener components 40 with the strip-like material 50, one of the female fastener components 40 is released by the feed gate 78 and slides by gravity vertically downwardly and then horizontally to the pick-up station 76, the position shown in FIG. 21. The transfer slide 84 begins movement forwardly or to the right as shown in FIG. 21, engages the female fastener component 40 at the pick-up station 76 in the fastener component pocket 90 and beings slidable movement of the female fastener component 40 toward the assembly station 86 as shown in FIG. 22, ultimately arriving at the assembly station 86 as shown in FIG. 23. Immediately upon the female fastener component 40 arriving at the assembly station 86, the vacuum at the assembly positioner 98 draws the head 42 of the female fastener component 40 downwardly into the positioning socket 100 so as to retain the same with the shank 44 thereof projecting upwardly while the transfer slide 84 begins its rearward withdrawal movement as shown in FIG. 24.

A worker then positions a portion of the strip-like material 50 containing the female fastener compoment opening 54 therein over the shank 44 of the female fastener component 40, from the position shown in FIG. 24 to the position shown in FIG. 6, while the transfer slide 84 completes its rearward withdrawal movement rearward of the pick-up station 76 and a next female fastener component 40 is released by the feed gate 78 for movement downwardly to the pickup station 76. At the same time, the assembly plunger 110 is moved downwardly from its upper withdrawn position shown in FIGS. 1, 2, 6 and 7 to its lower assembly position shown in FIG. 21 with the assembly tool 114 thereof engaging the shank 44 of the female fastener component 40 and outwardly flaring said shank into the form shown in FIG. 17 completing the assembly of the female fastener component 40 with the strip-like material 50. As the assembly plunger 110, after completing the assembly operation, begins its upward withdrawal movement as shown in FIG. 22, the assembly release mechanism 104 begins its upward movement from its lower normal position to its upper release position causing the upper horizontal surfaces 108 thereof to engage the strip-like material 50 adjacent the female fastener component 40 and raise the entire component and material assembly upwardly, still aligned with, but upwardly free of the assembly station 86 breaking the vacuum force from the component positioning socket 100 on the particular female fastener component 40 of such assembly and freeing such assembly for removal.

During this upward movement of the completed component and material assembly by the assembly release mechanism 104 reducing and breaking the vacuum forces there against for release thereof, the transfer slide 84 has begun its forward feed movement through the pick-up station 76 engaging the next of the female fastener components 40 and moving such female fastener component 40 to the assembly station 86 into the positioning socket 100 of the assembly positioner 98 beneath the already assembled and upwardly raised component and fastener assembly just described, that is, the next female fastener component 40 being moved sequentially as shown in FIGS. 7 and 22 into the final assembly station positioning shown in FIG. 23 ready for the next assembly operation with the strip-like material 50, the beginning of which is shown in FIG. 24. The already assembled and raised component and material assembly is removed by hand from the raised upper horizontal surfaces 108 of the assembly release mechanism 104, the position in FIG. 23 and the assembly release mechanism 104 returns downwardly to its normal position adjacent the assembly station 86 and permitting the next assembly operation in the same manner as previously described. Thus, the entire sequential operation of the apparatus is repeated and with a proper supply of the female fastener components 40 and the strip-like material 50 can continue on a mass-production basis.

Where the female fastener components 58 are involved, the operation of the apparatus is virtually identical, the only difference being in the form of the assembly tool 114 on the assembly plunger 110. If this same form of apparatus as just described is used with the female fastener component 58, during the assembly operation, the opening 54 of the strip-like material 50 is aligned directly above the female fastener component shank 62 and the assembly tool 114 of the assembly plunger 110 telescopes the female fastener component shank 62 forcing the strip-like material to stretch thereover and finally come to unstretched condition within the female fastener component groove 68 in the shank 62, such groove engaging the strip-like material and retaining the assembly when released from the apparatus. Obviously, therefore, the assembly operation is virtually the same and can be accomplished with this apparatus, however, it is preferred that an assembly of the form involving the female fastener component 58 and the strip-like material 50 would be carried out by the embodiment of the apparatus to be hereinafter described and otherwise used for assembly of the male fastener compoment 30 with the strip-like material.

The apparatus specifically adapted for assembly the male fastener component 30, and also advantageously usable for assembly the female fastener component 58, with the strip-like material 50 is illustrated in FIGS. 8 through 11, 25 and 26, and in most respects is very similar to the embodiment of apparatus hereinbefore described, including various standard control elements and formed from usual materials. More particularly, the embodiment of the apparatus shown in FIGS. 8 through 11, 25 and 26 includes a main frame 116 having a similar fastener component hopper 118 communicating with the upper end of a fastener component supply track 120 feeding the male fastener components 30 consecutively in alignment downwardly, releasing said male fastener components one at a time and feeding the same one at a time to a pick-up station 122. The operation of the fastener component hopper 118 and the form of the fastener component supply track 120 is virtually the same, the supply track having the same feeding mechanism as described relative to the first embodiment of apparatus for releasing the male fastener components 30 one at a time for vertical and then horizontal sliding movement to the pick-up station 122, the prime difference being that the male fastener components 30 are positioned in the supply track and at the pick-up station positioned reversed, that is, with the component heads 32 upwardly and the shanks 34 projecting vertically downwardly.

Also, the pick-up station 122 is located at a higher location on the main frame 116, but a similar transfer slide 124 is mounted movable by a double acting air cylinder 126 through the pick-up station 122 to and from an assembly positioner 128 forming the lower part of a vertically reciprocal plunger 130 moved upwardly and downwardly by a double acting air cylinder 132. The transfer slide 124 carries a fastener component engagement portion 134 through the pick-up station 122 with said engagement portion being formed with a fastener component pocket 136 engaging the pick-up station positioned male fastener component 30 and carrying the same forwardly to the assembly positioner 128 at the lower end of the upwardly reciprocated plunger 130. Such pick-up and feeding of the male fastener component 30 from the pick-up station 122 to the assembly positioner 128 is shown in sequence in FIGS. 25 and 26, it being noted that the male fastener component is retained in the reverse position described with the head 32 upwardly and the shank 34 projecting downwardly.

The assembly positioner 128 at the lower end of the plunger 130 is formed with an upwardly recessed, downwardly opening, component positioning socket 138 having a vacuum line 140 opening into said socket or internally thereof and connected to a usual source of vacuum supply. Thus, when one of the male fastener components 30 is carried from the pick-up station 122 to the assembly positioner 128 by the transfer slide 124 and with the plunger 130 withdrawn upwardly, the head 32 of the male fastener component is drawn into the component positioning socket 138 by the vacuum or suction forces of the vacuum supply line 140, the component positioning socket permitting the assembly positioner 128 to peripherally surround a large portion of the male fastener component head and with the male fastener component shank 34 aligned projecting downwardly. In this embodiment of the apparatus of the present invention, therefore, this upward positioning of the plunger 30 with the assembly positioner 128 at the lower end thereof and forming the component positioning socket 138 constitutes an intermediate transfer station 142 wherein the male fastener component 30 is retained aligned for final assembly with the strip-like material 50 but spaced above an assembly station 144.

As shown in FIGS. 8 through 11, the assembly station 144 includes a normally vertically upwardly projecting pilot pin 146 exactly vertically aligned with the shank 34 of the male fastener component 30 as retained by the component positioning socket 138 at the transfer station 142. The pilot pin 146 is mounted vertically reciprocal which, in a simple form, could be merely resiliently upwardly urged, but where the fastener components involved herein are formed of plastic, is provided with usual air controls generally indicated at 148 for, in a usual manner, withdrawing the pilot pin just ahead of downward movement of the plunger 130 carrying the assembly positioner 128 from the transfer station 142 to the assembly station 144. As shown herein, the air controls 148 for the pilot pin 146 may include an air cylinder 150 actionable with and controlled simultaneously with the air cylinder 132 of the plunger 130 so that the pilot pin 146 is reciprocated downwardly spaced directly ahead of the lower projecting end of one of the male fastener component shanks 34, said plunger being released or moved back upwardly during withdrawal of the plunger, all being capable of regulation and setting in the usual manner for adjusting the apparatus to accommodate the assembly of various of the male fastener components 30 to be assembled thereby.

In operation of this second embodiment of apparatus for assembling fastener components in strip-like material, the male fastener components 30 are fed from the fastener component hopper 118 consecutively downwardly retained aligned one above the other in the fastener component supply track 120 and fed one at a time in proper timing to the pick-up station 122. At the pick-up station 122, the transfer slide 124 is moved from its normal rear-ward position forwardly through the pick-up station engaging the particular male fastener component 30 in the fastener component pocket 136 thereof and carrying the same to the assembly positioner 128 at the lower end of the now upwardly withdrawn plunger 130, that is, at the transfer station 142. In the meantime, a worker positions one of the elements of strip-like material 50 over the pilot pin 146 at the assembly station 144 with the pilot pin engaged upwardly in one of the openings 52 of the strip-like material so as to retain the strip-like material exactly aligned for the component assembly operation as shown in FIG. 10.

As the transfer slide 124 is withdrawn rearwardly from the transfer station 142, the plunger 130 is then moved downwardly to the assembly station 144 carrying the particular of the male fastener components 30 downwardly therewith and projecting the shank 34 thereof through the aligned opening 52 of the strip-like material 50. During this insertion of the male fastener component shank 34 through the strip-like material opening 52, the strip-like material 50 stretches over the male component shank ultimately abutting the male component head 32 and returning to shape or assembled position within the male component groove 38 so as to complete the component and material assembly. Also during this insertion, the pilot pin 146 is preferably withdrawn by the air cylinder 150 closely ahead of the projecting end of the male component shank 34 so as to permit such assembly.

After the component-material assembly has been completed, the plunger 130 returns upwardly from the assembly station 144 to the transfer station 142 and is positioned ready for the movement of the next male fastener component 30 from the pick-up station 122 to the transfer station 142 by the transfer slide 124. During this upward movement of the plunger 130, the component-material assembly may be disengaged from the plunger or the component positioning socket 138 of the assembly positioner 128 thereof by a mere downward force or by reducing or completely cutting off the vacuum to the component positioning socket as desired and depending on the particular elements involved, in any event, by standard and well-known elements. Concurrently with the upward withdrawal of the plunger 130 and the removal of the completed component-material assembly, the pilot pin 146 is again projected upwardly ready for reception through the next opening 52 of the strip-like material 50 so that a next assembly operation can begin.

As hereinbefore pointed out, this same second embodiment of the apparatus of the present invention may be and is preferably, used for assembling the female fastener components 58 shown in FIGS. 19 and 20 with the strip-like material 50. The apparatus operates in substantially identical manner, the only alterations thereto required being the placement of the vacuum supply line 140 in the component positioning socket 138 to be displaced from the central opening 64 of the female fastener component 58 and the size of the pilot pin 146, all being obvious alterations and well within the skill of those versed in the art.

A still further embodiment of the apparatus of the present invention is shown in FIGS. 12 and 13, such apparatus being in all respects the same as the apparatus of FIGS. 1 through 7 and 21 through 24 with the exception of the manner in which the female fastener component 40 is retained at a similar assembly station 152 and the manner in which the component-material assembly is released from the assembly station. As shown, an assembly positioner 154 at the assembly station 152 is mounted reciprocal between a lower assembly position and an upper release position by a cylinder assembly 156 and includes pivotal grippers 158 closed gripping the head 42 of the female fastener component 40 and forming a socket therefor in the lower assembly position of the assembly positioner 154, and spreading transversely by virtue of the main part of the assembly positioner passing upwardly therethrough upon movement of the assembly positioner to its upward release position. Thus, the assembly positioner 154 at the assembly station 152 is shown in FIG. 12 with the grippers 158 retaining one of the female fastener components 40 ready for the assembly operation and the releasing operation of the apparatus is shown in FIG. 13 with the main portion of the assembly positioner raised spreading the grippers 158 permitting removal of the assembly, the apparatus otherwise operating in the same manner described relative to the apparatus of FIGS. 1 through 7 and 21 through 24.

Also, a further embodiment similar to the apparatus of FIGS. 8 through 10 and 25 and 26 as shown in FIGS. 14 and 15, the only differences again being the manner of retaining the male fastener component 30 at a transfer station 160 and the release thereof at an assembly station 162 upon completion of the component-material assembly. As shown in FIG. 14, a vertically reciprocal plunger 164 thereof but includes resiliently or spring-controlled gripper mechanism 168 mounting the grippers 170, the gripper mechanism normally being spring projected downwardly permitting the grippers to close over the assembly positioner 166 and forming a docket therefor, but moving upwardly relative to the assembly positioner and against the spring force spreading the grippers upwardly over the assembly positioner upon the grippers engaging the assembly station 162 with the assembly positioner progressing downwardly therethrough. As shown in FIG. 14, the plunger 164 is withdrawn upwardly positioning the assembly positioner 166 at the transfer station and the grippers 170 are closed gripping the head 32 of one of the male fastener components 30 aligned for the assembly operation, and as shown in FIG. 15, the plunger 164 has moved downwardly to assembly position placing the assembly positioner 166 at the assembly station 162 projecting the assembly positioner through the grippers 170 forcing the gripper mechanism 168 to withdraw upwardly against the spring force and spreading the grippers for completion of the assembly operation. Upon withdrawal of the plunger 164 and the assembly positioner 166 from the assembly station 162, the return downwardly of the gripper mechanism 168 relative to the plunger is slower than such plunger withdrawal movement so that the grippers 170 will not return closed sufficiently fast for disturbing the component-material assembly to thereby release the same, the embodiment of apparatus operating otherwise in the same manner as previously described relative to the apparatus of FIGS. 8 through 11, 25 and 26.

According to the principles of the present invention, therefore, the operation of the various embodiments of apparatus for assembling fastener components in strip-like material feeds extremely small fastener components one at a time to a pick-up station, moves said components one at a time to an assembly positioner retaining the components exactly aligned for final assembly with strip-like material, completes the assembly after the strip-like material has been positioned at an assembly station and finally releases the component-material assembly at the completion of the assembly operation. In certain embodiments of such apparatus, a next to be assembled fastener component is fed to the assembly station during release of the component-material assembly previously assembled, such release taking place by movement of the assembly away from the assembly station and during such next component feeding. In other forms of the apparatus of the present invention, the feeding of the components one at a time to the assembly positioner takes place aligned with but remote from the assembly station at a transfer station, and the assembly is completed by movement of the assembly positioner retaining the fastener component to and into assembly with the strip-like material at the assembly station.

As hereinbefore pointed out and described, the various forms of apparatus of the present invention incorporate unique method and apparatus concepts making possible the efficient assembly of extremely small fastener components with sheet-like material at exact predetermined locations on a rapid mass-production basis and with minimum possible production error, as well as a minimum of human handling. Furthermore, the apparatus is obviously adaptable to various types of fastener components, whether male or female fastener components and despite the various shapes thereof. Still further, the various forms of apparatus are readily adaptable to various forms of component and sheet-like material assembly occasioned by the particular method of securement of the fastener components with the sheet-like material in the final assembly, in one case illustrated, the stretching of the sheet-like material over a fastener component shank and engagement into a preformed fastener component groove, and in another case illustrated, the mere telescoping of the sheet-like material over the fastener component shank followed by a deformation of the fastener component shank to retain such assembly, clear examples of the wide versatility of the apparatus of the present invention.

We claim:

1. In apparatus for assembling fastener components with strip-like material, said fastener components being of the type having transversely enlarged heads and longitudinally extending shanks with said shanks projecting through said strip-like material in said assemblies, the combination of: a main frame; a supply track on said main frame including a channel formed therein receiving and removably retaining a fastener component in a predetermined position at a pick-up station; a transfer mechanism on said main frame including a component engagement portion movable adjacent said pick-up station and to and from an assembly positioner on said main frame, said component engagement portion being aligned releasably engaging said component at said pick-up station and moving said component from said pick-up station to said assembly positioner into a predetermined position in said assembly positioner during said movement of said component engagement portion; said assembly positioner including a positioning mechanism aligned receiving said component from said component engagement portion of said transfer mechanism and retaining said component in a predetermined position during movement of said component engagement portion of said transfer mechanism away from said assembly positioner and during relative movement between said positioning mechanism and strip-like material assembling a shank of said component projecting through said strip-like material.

2. Apparatus for assembling fastener components with strip-like material as defined in claim 1 in which said supply track is elongated with said channel extending lengthwise thereof to said pick-up station, said channel receiving a plurality of consecutive fastener components therein and slidable along said supply track to said pick-up station; and in which a feed mechanism is mounted in said supply track spaced from said pick-up station normally retaining said plurality of fastener components spaced from said pick-up station, said feed mechanism including means releasing said fastener components one at a time for slidable movement along said supply track in said channel to said pick-up station.

3. Apparatus for assembling fastener components with strip-like material as defined in claim 1 in which said supply track is elongated with said channel extending lengthwise therealong to said pick-up station, said supply track extending generally vertically and then arcuately into generally horizontally to said pick-up station, said channel receiving a plurality of consecutive fastener components therein slidable therealong to said pick-up station; in which a feed mechanism is mounted on said supply track spaced upwardly in a in a vertical portion of said supply track from said pick-up station, said feed mechanism including means normally retaining said fastener components in said supply track channel positioned consecutively above said feed mechanism, said means being movable for releasing said fastener components one at a time for slidable movement generally vertically downwardly and then generally horizontally by gravity to said pick-up station.

4. Apparatus for assembling fastener components with strip-like material as defined in claim 1 in which said transfer mechanism includes said component engagement portion mounted on a reciprocal slide movable adjacent said pick-up station and to and from said assembly positioner on said main frame.

5. Apparatus for assembling fastener components with strip-like material as defined in claim 1 in which said assembly positioner includes said positioning mechanism having a fastener component socket formed therein at least partially longitudinally receiving said enlarged head of said fastener components with said fastener component shanks extending longitudinally therefrom.

6. Apparatus for assembling fastener components with strip-like material as defined in claim 1 in which said assembly positioner includes said positioning mechanism having a fastener component socket formed therein at least partially receiving said transversely enlarged head of said fastener components longitudinally therein and with said fastener component shanks extending longitudinally therefrom, means including one of a vacuum force and pivotal grippers actionable on said positioning mechanism removably retaining said fastener components in said predetermined position during said movement of said component engagement portion of said transfer mechanism away from said assembly positioner and during said assembly relative movement.

7. Apparatus for assembling fastener components with strip-like material as defined in claim 1 in which said assembly positioner includes a reciprocal plunger having said positioning mechanism formed on an end portion thereof, said reciprocal plunger being movable toward and away from an assembly station with said positioning mechanism carrying said fastener components one at a time to said assembly station, said strip-like material being positioned at said assembly station during said assembly of a fastener component therewith, said plunger moving said fastener components into assembled position with said fastener component shank projecting through said strip-like material upon movement of said plunger to said assembly station.

8. Apparatus for assembling fastener components with strip-like material as defined in claim 1 in which said assembly positioner includes said positioning mechanism mounted stationary on said main frame aligned receiving said fastener component from said component engagement portion of said transfer mechanism and retaining said component in said predetermined position during movement of said component engagement portion of said transfer mechanism away from said assembly positioner, said strip-like material being telescoped over said component shank during said assembly; and in which an axially movable assembly plunger is mounted on said main frame reciprocally movable toward and away from said stationary positioning mechanism of said assembly positioner during said assembly of said fastener component and said strip-like material, said assembly plunger being aligned engaging one of said fastener component and said strip-like material during said assembly thereof.

9. Apparatus for assembling fastener components with strip-like material as defined in claim 1 in which said assembly positioner includes said positioning mechanism mounted stationary on said main frame at an assembly station aligned receiving said fastener component from said component engagement portion of said transfer mechanism and retaining said component in said predetermined position during said movement of said component engagement portion of said transfer mechanism away from said assembly positioner and during said assembly of said fastener component and said strip-like material, said strip-like material being movable telescoping over said fastener component shank during said assembly thereof; and in which assembly release mechanism is mounted on said main frame associated with said assembly positioner at said assembly station having means thereon movable after said fastener component and said strip-like material assembly for moving said assembly away from said positioning mechanism of said assembly positioner and spaced from said assembly station.

10. Apparatus for assembling fastener components with strip-like material as defined in claim 1 in which said assembly positioner includes said positioning mechanism mounted stationary on said main frame at an assembly station aligned receiving said fastener component from said component engagement portion of said transfer mechanism and retaining said component in said predetermined position during said movement of said component engagement portion of said transfer mechanism away from said assembly positioner at said assembly station and during said assembly of said fastener component and said strip-like material, said strip-like material being movable telescoping over said fastener component shank during said assembly thereof; in which an axially movable assembly plunger is mounted on said main frame reciprocally movable toward and away from said stationary positioning mechanism of said assembly positioner at said assembly station during said assembly of said fastener component and said strip-like material, said assembly plunger being aligned engaging one of said fastener component and said strip-like material during said assembly thereof; and in which assembly release mechanism is mounted on said main frame associated with said assembly positioner at said assembly station having means thereon movable after said fastener component and said strip-like material assembly for moving said assembly away from said positioning mechanism of said assembly positioner and spaced from said assembly station.

11. Apparatus for assembling fastener components with strip-like material as defined in claim 1 in which said supply track is elongated with said channel extending lengthwise thereof to said pick-up station, said channel receiving a plurality of consecutive fastener components therein and slidable along said supply track to said pick-up station; in which a feed mechanism is mounted in said supply track spaced from said pick-up station normally retaining said plurality of fastener components spaced from said pick-up station, said feed mechanism including means releasing said fastener components one at a time for slidable movement along said supply track in said channel to said pick-up station; and in which said transfer mechanism includes said component engagement portion mounted on a reciprocal slide movable adjacent said pick-up station and to and from said assembly positioner on said main frame.

12. Apparatus for assembling fastener components with strip-like material as defined in claim 1 in which said transfer mechanism includes said component engagement portion mounted on a reciprocal slide movable adjacent said pick-up station and to and from said assembly positioner on said main frame; and in which said assembly positioner includes said positioning mechanism having a fastener component socket formed therein at least partially receiving said transversely enlarged head of said fastener components longitudinally therein and with said fastener component shanks extending longitudinally therefrom, means including a vacuum force actionable on said positioning mechanism removably retaining said fastener components in said predetermined position during said movement of said component engagement portion of said transfer mechanism away from said assembly positioner and during said assembly relative movement.

13. Apparatus for assembling fastener componets with strip-like material as defined in claim 1 in which said assembly positioner includes a reciprocal plunger having a fastener component socket formed on an end portion thereof and opening axially of said plunger end portion, said plunger socket at least partially receiving said transversely enlarged heads of said fastener components longitudinally therein and with said fastener component shanks extending axially outwardly therefrom, means including a vacuum force actionable on said positioning mechanism removably retaining said fastener components in said predetermined position during said movement of said component engagement portion of said transfer mechanism away from said assembly positioner, said reciprocal plunger being movable toward and away from an assembly station with said positioning mechanism vacuum retaining and carrying said fastener components one at a time to said assembly station, said strip-like material being positioned at said assembly station during said assembly of a fastener component therewith, said plunger moving said fastener component into assembled position with said fastener component shank projecting through said strip-like material upon movement of said plunger to said assembly station; and in which a reciprocal pilot pin is mounted on said main frame extending from said assembly station axially aligned with said assembly positioner plunger and said plunger socket, said strip-like material being positioned over said pilot pin during said plunger movement of said fastener components into said assembled position, said pilot pin including means mounting said pilot pin for removal thereof from said strip-like material during said assembly of said fastener component shank projecting through said strip-like material.

14. Apparatus for assembling fastener components with strip-like material as defined in claim 1 in which said assembly positioner includes said positioning mechanism mounted stationary on said main frame at an assembly station having an upwardly opening fastener component socket formed therein aligned receiving said fastener components from said component engagement portion of said transfer mechanism, said fastener component socket at least partially receiving said transversely enlarged heads of said fastener components longitudinally therein and with said fastener component shanks extending longitudinally upwardly therefrom, means including one of a vacuum force and pivotal grippers actionable on said positioning mechanism removably retaining said fastener components in said socket during said movement of said component engagement portion of said transfer mechanism away from said assembly positioner at said assembly station and during said assembly, said strip-like material being telescoped over said component shank during said assembly; in which an axially movable assembly plunger is mounted on said main frame reciprocally movable downwardly to and upwardly away from said stationary positioning mechanism of said assembly positioner at said assembly station during said assembly of said fastener component and said strip-like material, said assembly plunger being aligned engaging one of said fastener component and said strip-like material during said assembly thereof; and in which assembly release mechanism is mounted on said main frame associated with said assembly positioner at said assembly station having means thereon movable after said fastener component and said strip-like material assembly for moving said assembly away from said positioning mechanism of said assembly positioner and spaced from said assembly station.

15. In apparatus for assembling fastener components with strip-like material, said fastener components being of the type having transversely enlarged heads and longitudinally extending shanks with said shanks projecting through said strip-like material in said assembly, the combination of: an assembly positioner including a positioning surface conforming to at least a part of a side of a transversely enlarged head of a fastener component longitudinally opposite a side of said component head from which a component shank extends longitudinally, at least one vacuum conduit through said positioning surface opening against said component head connected to vacuum supply means for vacuum retaining said component head against said positioning surface with said component shank extending therefrom during relative movement between said positioning surface and strip-like material to assemble said component shank projecting through said strip-like material; transfer means for transferring fastener components one at a time to said positioning surface of said assembly positioner and into said vacuum retainment against said positioner surface particularly positioned ready for said strip-like material assembly.

16. Apparatus for assembling fastener components with strip-like material as defined in claim 15 in which said positioning surface of said assembly positioner includes a socket formed therein at least partially receiving said transversely enlarged head of said fastener component with said fastener component shank extending longitudinally therefrom, said vacuum conduit opening through said positioning surface within said socket, said socket transversely peripherally surrounding a portion of said fastener component head.

17. Apparatus for assembly fastener components with strip-like material as defined in claim 15 in which said assembly positioner includes a reciprocal plunger movable from a transfer station to an assembly station, said plunger having said positioning surface formed on an end thereof with said positioning surface movable between said transfer and assembly stations, said positioning surface being formed at least partially by a socket opening axially of said plunger end and said vacuum conduit opening through said positioning surface within said socket, said socket receiving said fastener components one at a time therein retained by said vacuum supply means from said transfer means at said transfer station and transversely peripherally surrounding at least a part of said component head with said component shank extending therefrom axially from said plunger end, said plunger carrying each of said fastener components to said assembly station positioning said component shank projecting through said strip-like material at said assembly station.

18. Apparatus for assembly fastener components with strip-like material as defined in claim 15 in which said assembly positioner includes a reciprocal plunger movable from a transfer station to an assembly station, said plunger having said positioning surface formed on an end thereof with said positioning surface movable between said transfer and assembly stations, said positioning surface being formed at least partially by a socket opening axially of said plunger end and said vacuum conduit opening through said positioning surface within said socket, said socket receiving said fastener components one at a time therein retained by said vacuum supply means from said transfer means at said transfer station and transversely peripherally surrounding at least a part of said component head with said component shank extending therefrom axially from said plunger end, said plunger carrying each of said fastener components to said assembly station positioning said component shank projecting through said strip-like material at said assembly station; and in which a reciprocal pilot pin is mounted at said assembly station normally projecting toward said plunger end of said assembly positioner, said strip-like material being telescoped over said pilot pin aligned for assembly with said component shank during movement of said component by said plunger of said assembly positioner toward said assembly station, said pilot pin having means mounting the same for movement out of said strip-like material telescoping as said plunger of said assembly positioner moves said component shank into said strip-like material assembly.

19. Apparatus for assembling fastener components with strip-like material as defined in claim 15 in which said assembly positioner is mounted stationary at an assembly station and includes a socket formed therein, said positioning surface being formed at least partially by surfaces of said socket, said vacuum conduit opening through said positioning surface within said socket, said socket receiving said fastener component therein from said transfer means and peripherally surrounding at least a part of said fastener component head with said component shank extending therefrom to vacuum retain said component during movement of said strip-like material over said component shank during said assembly.

20. Apparatus for assembling fastener components with strip-like material as defined in claim 15 in which said assembly positioner is mounted stationary at an assembly station and includes a socket formed therein, said positioning surface being formed at least partially by surfaces of said socket, said vacuum conduit opening through said positioning surface within said socket, said socket receiving said fastener component therein from said transfer means and peripherally surrounding at least a part of said fastener component head with said component shank extending therefrom to vacuum retain said component during movement of said strip-like material over said component shank during said assembly; and in which reciprocal release mechanism is mounted at said assembly station adjacent said assembly positioner normally retracted permitting said assembly positioner socket vacuum retention of said fastener component and said strip-like material movement telescoped over said component shank during said assembly, said release mechanism including means extending said release mechanism spaced away from said positioning surface and said socket of said assembly positioner upon completion of said fastener component and said strip-like material assembly engaging portions of said assembly and forcing said assembly away from retention by said socket vacuum retention of said assembly positioner.

21. In apparatus for assembling fastener components with strip-like material, said fastener components being of the type having transversely enlarged heads and longitudinally extending shanks with said shanks projecting through said strip-like material in said assemblies, the combination of: an assembly positioner including a positioning mechanism having a positioning surface conforming to at least a part of a side of a transversely enlarged head of a fastener component longitudinally opposite a side of said component head from which a component shank extends longitudinally, retainment means for retaining said component head against said positioning surface with said component shank extending therefrom during movement of strip-like material telescoped over said component shank and assembled therewith; a release mechanism associated with said assembly positioner including release surfaces normally positioned adjacent said positioning surface of said positioning mechanism and movable away from said positioning surface in a direction of said component shank extenstion, said release surfaces being aligned engaging a component and strip-like material assembly and forcing said assembly from said positioning surface of said positioning mechanism an retainment by said retainment means during said movement of said release surfaces away from said positioning surface, release surface movement means operably connected to said release surfaces for moving said release surfaces and thereby said component and strip-like material assembly away from said positioning surface of said positioning mechanism and retainment by said retainment means.

22. Apparatus for assembling fastener components with strip-like material as defined in claim 21 in which said release surfaces of said release mechanism are positioned relative to said assembly positioner transversely outwardly of at least two sides of said fastener component head during retainment of said fastener component and assembly of said fastener component with said strip-like material, said release surfaces engaging said strip-like material transversely outwardly of said component head during movement to said extended position.

23. Apparatus for assembling fastener components with strip-like material as defined in claim 21 in which said assembly positioner is mounted at an assembly station with said positioning surface of said positioning mechanism located at said assembly station; in which a reciprocal plunger is movable toward and away from said assembly station engageable with certain of said fastener components and said strip-like material during movement to said assembly station and aiding in completing said assembly of said fastener component and said strip-like material, said plunger being moved to said assembly station after retainment of said fastener component by said assembly positioner and positioning of said strip-like material ready for completion of said assembly and being moved from said assembly station prior to operation of said release surface movement means.

24. Apparatus for assembling fastener components with strip-like material as defined in claim 21 in which said assembly positioner is mounted at an assembly station and includes a socket forming at least part of said positioning surface receiving said component head therein transversely peripherally surrounding at least a part thereof with said component shank extending from said socket, said retainment means including a vacuum conduit opening into said socket connected to vacuum supply means for applying a vacuum force against said component head for retaining said component head against said positioning surface; in which said release surfaces of said release mechanism in a retracted position of said release mechanism are positioned transversely outwardly of at least two sides of said assembly positioner socket and engage said strip-like material of a fastener component and strip-like material assembly after said assembly forcing said fastener component head out of vacuum retainment by said assembly positioner socket and said assembly away from said assembly station; and in which a reciprocal plunger is mounted movable toward and away from said assembly station engageable with parts of said fastener component and strip-like material assembly during said assembly thereof, said plunger including means moving said plunger to said assembly station during said fastener component and strip-like material assembly while said release mechanism is in retracted position and moving said plunger away from said assembly station prior to movement of said release mechanism to extended position.

25. In a method of assembling fastener components with strip-like material, said fastener components being of the type having transversely enlarged heads and longitudinally extending shanks with said shanks projecting through said strip-like material in said assembly; the steps of: feeding components to a pick-up station and positioning said components in a predetermined position at said pick-up station ready for transfer one at a time to an assembly positioner; transferring said components one at a time from said pick-up station to said assembly positioner; retaining said components one at a time at said assembly positioner oriented ready for telescopic assembly of sheet-like material with a component shank; telescopically assembling said sheet-like material with said component shank by relative motion between said sheet-like material and said component shank and while retaining said component with said assembly positioner; and releasing said assembly from said assembly positioner.

26. A method of assembling fastener components with strip-like material as defined in claim 25 in which said step of feeding said components to said pick-up station includes retaining a plurality of said components in a supply track arranged in consecutive order, releasing said components one at a time for feeding along said supply track to said pick-up station.

27. A method of assembling fastener components with strip-like material as defined in claim 25 in which said step of feeding said components to said pick-up station includes retaining a plurality of said components in a supply track aligned in consecutive order, releasing said components one at a time for feeding to said pick-up station, feeding each of said released components along said supply track to said pick-up station by gravity.

28. A method of assembling fastener components with strip-like material as defined in claim 25 in which said step of transferring said components from said pick-up station to said assembly positioner includes moving a transfer mechanism through said pick-up station and to said assembly positioner, engaging a component at said pick-up station and moving said component to said assembly positioner during said transfer mechanism movement, depositing said component at said assembly positioner with said transfer mechanism.

29. A method of assembling fastener components with strip-like material as defined in claim 25 in which said step of retaining said components at said assembly positioner includes the retaining of said components one at a time at said assembly positioned by use of a gripper.

30. A method of assembling fastener components with strip-like material as defined in claim 25 in which said step of transferring said components from said pick-up station to said assembly positioner includes the transferring of said components one at a time from said pick-up station to said assembly positioner normally located at a transfer station remote from an assembly station; in which said step of telescopically assembling said sheet-like material with said component shank includes the moving of said assembly positioner and thereby said component from said transfer station to said assembly station and engaging said component shank through said sheet-like material positioned at said assembly station.

31. A method of assembling fastener components with strip-like material as defined in claim 25 in which said step of transferring said components from said pick-up station to said assembly positioner includes the transferring of said components one at a time from said pick-up station to said assembly positioner located at an assembly station; in which said step of retaining said components at said assembly positioner includes the retaining of said components one at a time stationary at said assembly station by said assembly positioner oriented ready for telescopic assembly of said sheet-like material with said component shank; in which said step of telescopically assembling said sheet-like material with said component shank includes the movement of said sheet-like material over said component shank.

32. A method of assembling fastener components with strip-like material as defined in claim 25 in which said step of transferring said components from said pick-up station to said assembly positioner includes the transferring of said components one at a time from said pick-up station to said assembly positioner located at an assembly station; in which said step of retaining said components at said assembly positioner includes the retaining of said components one at a time stationary at said assembly station by said assembly positioner oriented ready for telescopic assembly of said sheet-like material with said component shank; in which said step of telescopically assembling said sheet-like material with said component shank includes the movement of said sheet-like material over said component shank; and in which said step of releasing said assembly includes said releasing of said assembly from said assembly positioner by engaging said assembly with movable surfaces at said assembly station and moving said assembly by said movable surfaces away from said assembly station and said assembly positioner.

33. A method of assembling fastener components with strip-like material as defined in claim 25 in which said step of transferring said components from said pick-up station to said assembly positioner includes the moving of transfer mechanism through said pick-up station to and from said assembly positioner, engaging said components one at a time at said pick-up station by said transfer mechanism and moving said components with said transfer mechanism to said assembly positioner, depositing said components into said retainment at said assembly positioner with said transfer mechanism; in which said step of retaining said components at said assembly positioner includes said retaining of said components one at a time at said assembly positioner by retainment forces applied at said assembly positioner.

34. A method of assembling fastener components with strip-like material as defined in claim 25 in which said retaining of said components at said assembly positioner includes the positioning of said assembly positioner at a transfer station, applying vacuum forces to said components at said transfer station through said assembly positioner retaining said components one at a time at said assembly positioner oriented ready for said telescopic assembly of said sheet-like material with said component shank; in which said step of telescopically assembling said sheet-like material with said component shank includes the moving of said components one at a time by movement of said assembly positioner from said transfer station to an assembly station spaced from said transfer station and while said components are vacuum retained by said assembly positioner, moving said component shanks through said sheet-like material at said assembly station to telescopically assemble said sheet-like material with said component shanks.

35. A method of assembling fastener components with strip-like material as defined in claim 25 in which said step of transferring said components from said pick-up station to said assembly positioner includes the transferring of said components one at a time from said pick-up station to said assembly positioner stationary at an assembly station; in which said step of retaining said components at said assembly positioner includes the retaining of said components one at a time at said assembly station in said assembly positioner by the application of vacuum forces; in which said step of telescopically assembling said sheet-like material with said component shank includes the movement of said sheet-like material over said component shank while said component is vacuum retained at said assembly station by said assembly positioner to telescopically assemble said sheet-like material with said component shank.

36. A method of assembling fastener components with strip-like material as defined in claim 25 in which said step of transferring said components from said pick-up station to said assembly positioner includes the transferring of said components one at a time from said pick-up station to said assembly positioner stationary at an assembly station; in which said step of retaining said components at said assembly positioner includes the retaining of said components one at a time at said assembly station in said assembly positioner by the application of vacuum forces; in which said step of telescopically assembling said sheet-like material with said component shank includes the movement of said sheet-like material over said component shank while said component is vacuum retained at said assembly station by said assembly positioner to telescopically assemble said sheet-like material with said component shank; in which said step of releasing said assembly from said assembly positioner includes the releasing of said assembly from said assembly positioner at said assembly station by interrupting said vacuum forces between said assembly positioner and that particular of said components of said assembly.

37. A method of assembling fastener components with strip-like material as defined in claim 25 in which said step of transferring said components from said pick-up station to said assembly positioner includes the transferring of said components one at a time from said pick-up station to said assembly positioner stationary at an assembly station; in which said step of retaining said components at said assembly positioner includes the retaining of said components one at a time at said assembly station in said assembly positioner by the application of vacuum forces; in which said step of telescopically assembling said like material with said component shank includes the movement of said sheet-like material over said component shank while said component is vacuum retained at said assembly station by said assembly positioner to telescopically assemble said sheet-like material with said component shank; in which said step of releasing said assembly from said assembly positioner includes the releasing of said assembly from said assembly positioner at said assembly station by movement of said assembly away from said assembly positioner and said assembly station to interrupt said vacuum forces of said assembly positioner.

38. A method of assembling fastener components with strip-like material as defined in claim 25 in which said step of transferring said components from said pick-up station to said assembly positioner includes the transferring of said components one at a time from said pick-up station to said assembly positioner stationary at an assembly station; in which said step of retaining said components at said assembly positioner includes the retaining of said components one at a time at said assembly station in said assembly positioner by the application of vacuum forces; in which said step of telescopically assembling said sheet-like material with said component shank includes the movement of said sheet-like material over said component shank while said component is vacuum retained at said assembly station by said assembly positioner to telescopically assemble said sheet-like material with said component shank; in which said step of releasing said assembly from said assembly positioner includes the releasing of said assembly from said assembly positioner at said assembly station by movement of said assembly away from said assembly positioner and said assembly station to interrupt said vacuum forces of said assembly positioner, performing said step of transferring said components one at a time from said pick-up station to said assembly positioner to transfer a next component to said assembly positioner simultaneously with said movement of said assembly from said assembly positioner and said assembly station.

39. In a method of assembling fastener components with strip-like material, said fastener components being of the type having transversely enlarged heads and longitudinally extending shanks with said shanks projecting through said strip-like material in said assemblies; the steps of: transferring fastener components one at a time to an assembly positioner; retaining said components one at a time at said assembly positioner oriented ready for telescopic assembly of sheet-like material with a component shank by applying vacuum to a side of a transversely enlarged head of each of said components opposite a side of said component head from which said component shank extends longitudinally; telescopically assembling said sheet-like material with said component shank by relative motion between said sheet-like material and said component shank and while vacuum retaining said component with said assembly positioner; and releasing said assembly from said assembly positioner through reduction of effect of said vacuum application.

40. A method of assembling fastener components with strip-like material as defined in claim 39 in which said step of transferring said fastener components to said assembly positioner includes the transferring of said fastener components one at a time to a movable assembly positioner during location of said assembly positioner at a transfer station; in which said step of telescopically assembling said sheet-like material with said component shank includes the moving of said assembly positioner from said transfer station to an assembly station while retaining said components at said assembly positioner, moving said component shank through said sheet-like material at said assembly station while still vacuum retaining said component with said assembly position.

41. A method of assembling fastener components with strip-like material as defined in claim 39 in which said transferring of said fastener components to said assembly positioner includes the transferring of said fastener components one at a time to a stationary assembly positioner at an assembly station; in which said step of releasing said assembly from said assembly positioner includes the releasing of said assembly from said stationary assembly positioner at said assembly station by movement of said assembly away from said assembly station to reduce said effect of said vacuum application by said assembly movement.

42. A method of assembling fastener components with strip-like material as defined in claim 39 in which said step of transferring said fastener components to said assembly positioner includes the transferring of said fastener components one at a time to a stationary assembly positioner at an assembly station; in which said step of telescopically assembling said sheet-like material with said component shank includes the movement of said sheet-like material over said component shank during said vacuum retention of said component at said assembly station by said assembly positioner to telescopically assemble said like material with said component shank; in which said step of releasing said assembly from said assembly positioner includes the engaging of said sheet-like material of said assembly adjacent said assembly component with movable surfaces and moving said assembly away from said assembly station and said assembly positioner vacuum retainment.

43. A method of assembling fastener components with strip-like material as defined in claim 39 in which said step of transferring said fastener components to said assembly positioner includes the transferring of said fastener components one at a time to a stationary assembly positioner at an assembly station; in which said step of telescopically assembling said sheet-like material with said component shank includes the movement of said sheet-like material over said component shank to telescopically assemble said sheet-like material with said component shank and during said vacuum retention of said component by said assembly positioner; in which said step of releasing said assembly from said assembly positioner includes the moving of said assembly away from said assembly positioner and said assembly station to reduce said effect of said vacuum application on said assembly component and release said assembly from said assembly positioner, and simultaneously with said movement of said assembly from said assembly station, transferring a next fastener component for a next component and sheet-like material assembly to said assembly station and vacuum retaining said next component by said assembly positioner.

44. A method of assembling fastener components with strip-like material as defined in claim 39 in which said step of transferring fastener components to said assembly positioner includes the transferring of said fastener components one at a time to a stationary assembly positioner located at an assembly station; in which said step of retaining said components at said assembly positioner includes the retaining of said components one at a time at said assembly station by said assembly positioner; in which said step of telescopically assembling said sheet-like material with said component shank includes the movement of said sheet-like material over said component shank while said component shank is vacuum retained by said assembly positioner at said assembly station to telescopically assemble said sheet-like material with said component shank; in which said step of releasing said assembly from said assembly positioner includes the releasing of said assembly from said assembly positioner at said assembly station by engagement of said sheet-like material of said assembly adjacent said component of said assembly with movable surfaces and moving said assembly away from said assembly positioner and said assembly station by movement of said surfaces, and simultaneously with the movement of said assembly away from said assembly positioner and said assembly station by said surface movement, transferring a next fastener component for a next component and sheet-like material assembly to said assembly positioner at said assembly station and retaining said next component by said assembly positioner.

45. In a method of assembling fastener components with strip-like material, said fastener components being of the type having transversely enlarged heads and longitudinally extending shanks with said shanks projecting through said strip-like material in said assemblies; the steps of: transferring a fastener component to an assembly station; retaining said fastener component at said assembly station oriented ready for telescopic assembly of sheet-like material with a shank of said component; telescopically assembling said sheet-like material with said component shank while retaining said component at said assembly station; moving said assembly to a position spaced away from said assembly station while said component of said assembly remains generally aligned in a predetermined path from said assembly station; and during said movement of said assembly to said position spaced away from said assembly station, transferring a next fastener component to said assembly station and into said oriented retainment at said assembly station.

46. A method of assembling fastener components with strip-like material as defined in claim 45 in which said step of moving said assembly to said position spaced away from said assembly stationed includes the moving of said assembly to said position spaced away from said assembly station by engagement of said assembly sheet-like material adjacent said assembly component with said assembly component remaining generally aligned in said predetermined path from said assembly station throughout said engagement moving.

47. A method of assembling fastener components with strip-like material as defined in claim 45 in which said step of retaining said fastener component at said assembly station includes the retaining of said fastener component at said assembly station through vacuum application and by said vacuum application maintaining said component oriented ready for said telescopic assembly of said sheet-like material with said shank of said component; in which said step of moving said assembly to said position spaced away from said assembly station includes the reducing of the effects of said vacuum application at said assembly station by moving said assembly to said position spaced away from said assembly station but while said component of said assembly remains in said general alignment in said predetermined path from said assembly station.

48. A method of assembling fastener components with strip-like material as defined in claim 45 in which said step of retaining said fastener component at said assembly station includes the application of vacuum forces to said component at said assembly station to retain said component at said assembly station in said orientation ready for said telescopic assembly of said sheet-like material with said shank of said component; in which said step of moving said assembly to said position spaced away from said assembly station includes the engaging of said assembly sheet-like material adjacent said assembly component and raising said assembly from said assembly station to reduce said vacuum application and interrupt said vacuum retainment; and in which said step of transferring said next fastener component to said assembly station includes the transferring of said next fastener component to said assembly station and into said vacuum retained oriented retainment at said assembly station beneath said upward moved assembly and during said upward movement of said assembly.

* * * * *